Takei

United States Patent [19]

[11] Patent Number: 5,207,115
[45] Date of Patent: May 4, 1993

[54] X-Y DRIVE APPARATUS

[75] Inventor: Seiji Takei, Yokohama, Japan

[73] Assignee: Nippon Thompson Co., Ltd., Tokyo, Japan

[21] Appl. No.: 849,726

[22] Filed: Mar. 11, 1992

[30] Foreign Application Priority Data

Mar. 15, 1991 [JP] Japan .................. 3-74382

[51] Int. Cl.$^5$ ............................. F16H 19/06
[52] U.S. Cl. .................. 74/479 R; 74/89.22; 108/143; 108/20; 108/137; 248/661; 248/178; 248/184; 248/657; 269/73; 414/749
[58] Field of Search ............ 74/479, 479 PH, 479 PF, 74/89.22; 108/143, 20, 137; 248/661, 178, 184, 657; 269/73; 414/749

[56] References Cited

U.S. PATENT DOCUMENTS 3,155,383 11/1964 Whitmore .................. 108/20

FOREIGN PATENT DOCUMENTS 0074883 3/1983 European Pat. Off. .......... 74/89.22

Primary Examiner—Allan D. Herrmann
Assistant Examiner—William O. Trousdell
Attorney, Agent, or Firm—Skjerven, Morrill, MacPherson, Franklin & Friel

[57] ABSTRACT

An X-Y drive apparatus suitable for use in positioning an electronic component or the like at a desired position, such as a mounting position of a printed circuit board, is provided. Each of X and Y table units includes an elongated housing provided with a pair of stationary pulleys at its opposite ends and a table provided with a pair of moving pulleys. A pair of brackets is also mounted on the housing, each located between one of the stationary pulleys and a corresponding one of the moving pulleys. A belt, having its one end fixedly attached to one of the brackets, extends first around one of the moving pulleys, then around each of the stationary pulleys, and then around the remaining moving pulleys with its remaining end fixedly attached to the remaining bracket.

9 Claims, 4 Drawing Sheets

X-Y DRIVE APPARATUS

BACKGROUND OF THE INVENTION

1. Field of the Invention

This invention generally relates to a two-axis or two-dimensional table assembly, and, in particular, to an X-Y drive apparatus of such an X-Y table assembly suitable for use in positioning a desired object, such as an electronic component, at a desired location, such as a mounting position on a printed circuit board.

2. Description of the Prior Art

An X-Y table assembly and an X-Y drive apparatus for use in such an assembly are well known and widely used in various applications. A typical prior art X-Y drive apparatus is described and claimed in the U.S. patent application No. 07/799,493 filed Nov. 27, 1991, claiming the Convention Priority from the Japanese Utility Model Application No. 2-126630, both of which have been assigned to the assignee of this application and are hereby incorporated by reference. However, the X-Y drive apparatus described in this earlier patent application uses a ball screw shaft and a worm and gear combination for transmitting power between X and Y table units.

Another typical prior art X-Y drive apparatus is schematically illustrated in FIG. 4 of this application. It is to be noted that although FIG. 4 illustrates in exploded view the detailed structure of one of X and Y table units of an X-Y drive apparatus, the illustrated structure may be incorporated into an X-Y drive apparatus shown in FIG. 1.

As shown in FIG. 1, an X-Y drive apparatus typically includes a pair of X and Y drive units 1 and 2 which extend in X and Y directions, respectively, on a common plane. Since the X and Y table units 1 and 2 are identical in structure, only the detailed structure of the X table unit 1 is shown in exploded view in detail in FIG. 4.

As shown in FIG. 1, the X-Y drive apparatus includes the X table unit 1 which is typically fixedly mounted on an object, such as a stationary frame, which is elongated in the X direction and includes an X table 3 which is supported to move in the X direction back and forth. The X table 3 is provided with a pair of side projections 3a which extend upwardly from the opposite sides of the table 3, and the Y table unit 2 is fixedly mounted on the side projections 3a of the X table 1 so that the Y table 2 may move in the X direction back and forth as supported by the X table 3. The Y table unit 2 is elongated in the Y direction, which is perpendicular to the X direction in the illustrated example, and the Y table unit 2 also includes a Y table 3 which may move in the Y direction back and forth. As a result, the Y table 3 of the Y table unit 2 may move in any direction on a plane which is parallel to a surface on which the X table unit 1 is fixedly mounted.

As shown in FIG. 1, each of the X and Y table units 1 and 2 is generally in the form of an elongated box including an elongated bottom plate 30, a pair of elongated side plates 5, a pair of end plates and a top cover plate 10 which is somewhat narrower in width to thereby define a gap between each side of the cover plate 10 and a corresponding one of the side plates 5.

The detailed internal structure of each of the tables units 1 and 2 in a typical prior art X-Y drive apparatus is shown in FIG. 4 and a detailed description for the X table unit 1 will be had below with reference to FIG. 4.

As shown in FIG. 4, the X table unit 1 includes a motor 6 which is fixedly mounted on the side plate 5 at its leftmost end. The motor 6 has a motor shaft 6a which extends in the Y direction and into the center hole of a pulley 7, so that the pulley 7 rotates in unison with the motor shaft 6a. Another pulley 8 is rotatably provided in the X table unit 1 at its other end and an endless belt 9 is provided as extending between the pulleys 7 and 8. The X table 3 is fixedly attached to the upper run of the endless belt 9 so that the X table 3 moves in unison with the movement of the endless belt 9.

In the structure shown in FIG. 4, the X table 3 is generally square or rectangle in shape and it has a width which allows the X table 3 to be fit in a space defined between the pair of side plates 5, so that the X table 3 can travel in the X direction in the space defined between the pair of side plates 5. The X table 3 is provided with a pair of side projections 3a along its opposite sides, and these side projections 3a extend through the gaps between the top cover plate 10 and the pair of side plates 5 and extend above the top cover plate 10 so that the Y table 2 may be fixedly attached to the X table 3 via its side projections 3a. The side projections 3a may be formed integrally with the rest of the X table 3 or they may be formed separately and fixedly attached to the rest of the X table 3.

Inside the X table unit 1 is also provided a pair of linear motion guide units 11 located on both sides of and in parallel with the endless belt 9 as shown in FIG. 4. Each of the pair of linear motion guide units 11 has a substantially identical structure and includes a rail 13 which is fixedly mounted on the bottom plate 30 and a slider 15 which is slidably mounted on the rail 13. Such a linear motion guide unit is well known in the art and thus its detailed description will not be repeated here. Any well known linear motion guide unit may be employed in the present invention. In the illustrated structure, the rail 13 is elongated and formed with a pair of guide grooves 12 on both sides surfaces thereof extending in parallel with the longitudinal axis of the rail 13. The slider 15 is generally saddle-shaped and thus slidably mounted on the rail 13 in a straddling manner. Although not shown specifically, the slider 15 includes a plurality of rolling members 14, such as balls or rollers, at least some of which are partly received in the corresponding groove 12 to thereby provide a rolling contact between the rail 13 and the slider 15. In one embodiment, a pair of endless circulating paths may be provided in the slider 15, in which case the rolling members 15 may roll endlessly along the endless circulating path so that the slider 15 may linearly move along the rail 13 as long as the rail 13 extends.

As shown in FIG. 4, the X table 3 is also fixedly mounted on each of the sliders 15 on both sides of the endless belt 9 and thus any load applied to the X table 3 in the downward direction is borne by either one or both of these sliders 15 or the left and right linear motion guide units 11.

In operation, when the motor 6 is energized, the pulley 7 is driven to rotate in a selected direction so that the endless belt 9 starts to travel in unison. As a result, the X table 3 also moves in unison with the endless belt 9. Depending on the direction of rotation selected for the motor 6, the X table 3 moves either to the left or to the right. The range of movement of the X table 3 is typically determined and controlled by a microcomputer (not shown) which is typically connected to a control circuit (not shown) which also controls the operation of the motor 6. In addition, although not shown specifically, a detector is typically provided inside the X table unit 1, for example, as mounted on the bottom plate 30 for detecting the position of the X table 3 along the X axis.

As indicated before, the Y table unit 2 is fixedly mounted on the X table 3 of the X table unit 1 through the side projections 3a so that the Y table unit 2 and the X table 3 move in unison at all times. As also described before, since the Y table unit 2 is identical in structure to the X table unit 1, the Y table unit 2 has a Y table 3 which may move back and forth along the Y direction which is perpendicular to the X direction. As a result, the Y table 3 may move in any direction in a plane in parallel with the surface on which the X table unit 1 is fixedly mounted. In this sense, the Y table 3 in the illustrated structure may be said to constitute an X-Y table which may move in any desired direction in its plane relative to the surface on which the X table unit 1 is mounted.

However, in the prior art structure as described above, since the endless belt 9 extends between the pair of pulleys 8 and 9, the amount of movement of the belt 9 is necessarily limited to that of the X table 3. Besides, since the Y table unit 2 is mounted on the X table unit 1, the total weight of the Y table unit 2, including its motor 6, is applied to the X table 3 of the X table unit 1 so that an increased capacity is required for the motor 6 of the X table unit 1. In addition, in the case of occurrence of a backlash or the like, since the belt 9 and the X table 3 are same in the amount of movement, an error may be produced by such a backlash.

SUMMARY OF THE INVENTION

In accordance with the present invention, there is provided an X-Y drive apparatus comprising a first table unit including a first table movable back and forth in a first direction and a second table unit mounted on the first table and including a second table movable in a second direction which is different from the first direction. In the preferred embodiment, the first and second directions are substantially perpendicular to each other.

Each of the first and second table units further includes an elongated housing defining a longitudinal axis; a pair of first guiding means arranged in a line in parallel with the longitudinal axis and attached to the table; a pair of second guiding means arranged along the line of arrangement of and away from said pair of first guiding means and attached to the housing; a pair of holding means, each attached to the housing at a location between the first and second guiding means; and a coupling means having one end fixedly attached to one of said pair of holding means and extending first around one of the first guiding means, then each of the pair of second guiding means and then the remaining first guiding means to have the other end fixedly attached to the other holding means.

Preferably, the each of the first and second guiding means includes a rotary member, such as a pulley. In addition, the coupling means preferably includes a belt. The holding means preferably includes a bracket. In one embodiment, the housing includes a bottom plate, a pair of side plates, a pair of end plates and a top cover plate which is somewhat narrower to thereby define a gap between the top cover plate and each of the pair of side plates. The table is preferably provided with a pair of side projections which project outside the housing at least partly through the gaps when the table is set in position in the interior space defined by the housing.

The table unit also preferably includes a motor which is operatively coupled to a selected rotary member around which the coupling means extend. In addition, the table unit preferably further includes a supporting means mounted on the housing for supporting the table so as to provide a bearing capacity of any load applied to the table in the downward direction. In the preferred embodiment, the supporting means includes at least one linear motion guide unit interposed between the housing and the table.

It is therefore a primary object of the present invention to obviate the disadvantages of the prior art as described above and to provide an improved X-Y drive apparatus.

Another object of the present invention is to provide an improved X-Y table assembly suitable for use in positioning a desired object, such as an electrical component, at a desired location, such as a mounting position of a printed circuit board.

A further object of the present invention is to provide an improved X-Y drive apparatus which allows to reduce the power requirement for a driving force.

A still further object of the present invention is to provide an improved X-Y drive apparatus which is prevented from producing an error due, for example, to backlash or the like in its power transmitting mechanism.

Other objects, advantages and novel features of the present invention will become apparent from the following detailed description of the invention when considered in conjunction with the accompanying drawings.

DESCRIPTION OF THE PREFERRED EMBODIMENTS

Figure 1:
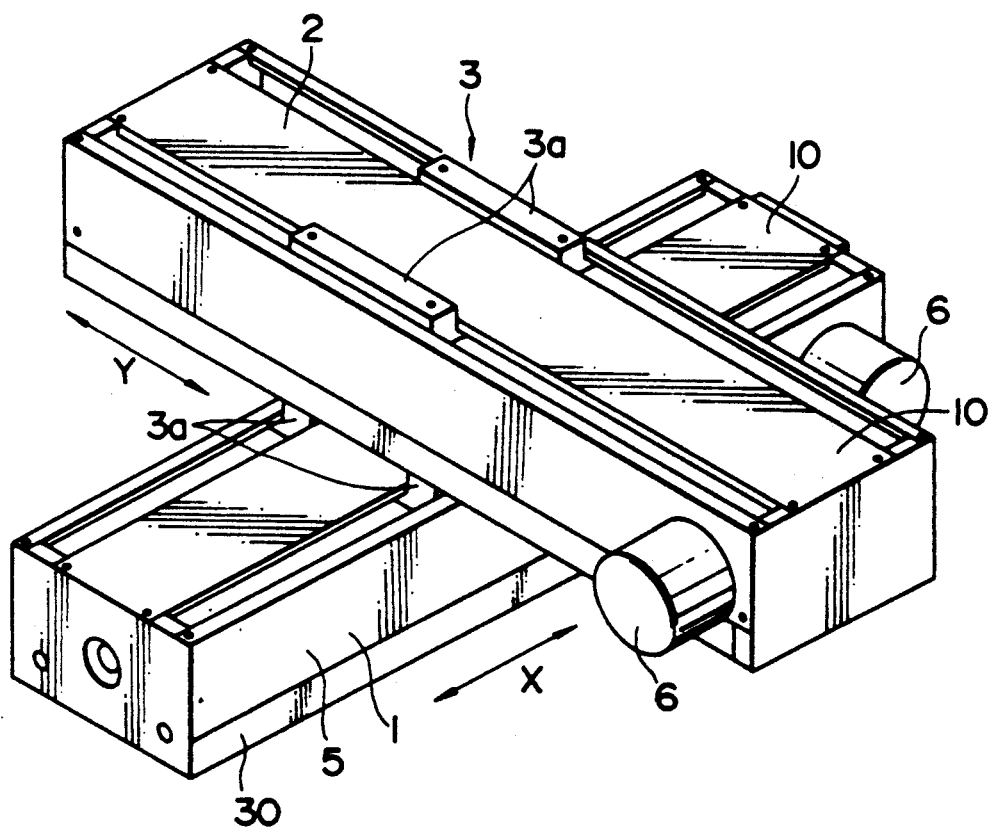
FIG. 1 is a schematic illustration showing in perspective view the overall structure of an X-Y drive apparatus to which the present invention may be applied advantageously.
Figure 1:
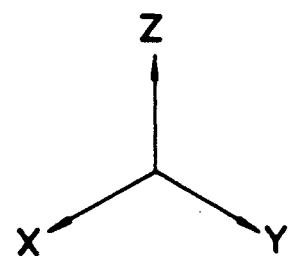
Figure 2:
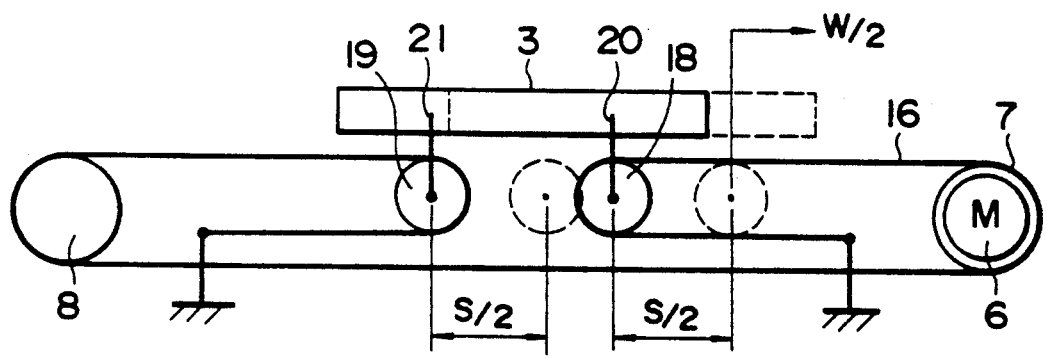
FIG. 2 is a schematic illustration showing in principle the basic structure of an X-Y drive apparatus constructed in accordance embodiment of the present invention.
Figure 3:
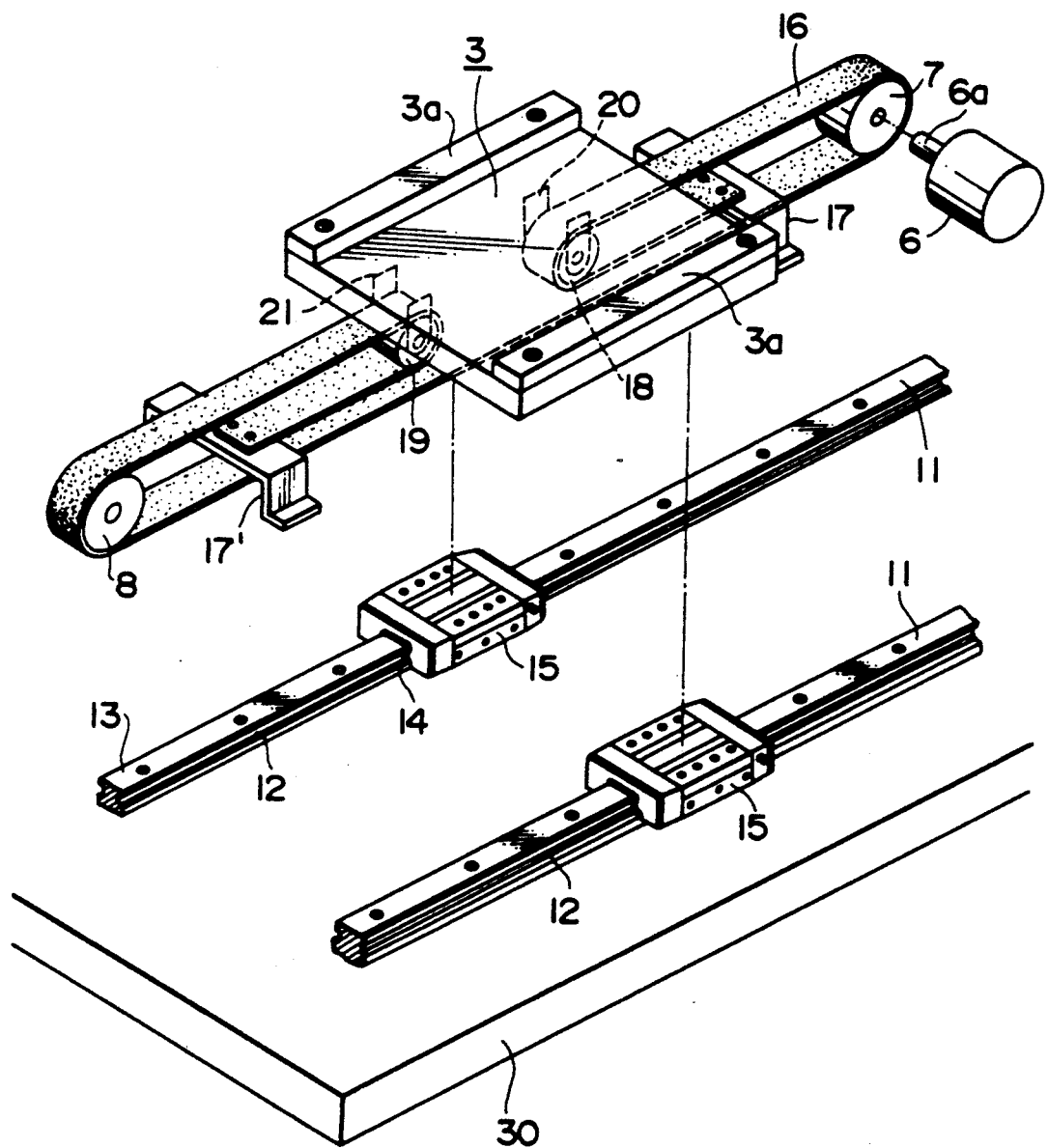
FIG. 3 is a schematic illustration showing in perspective view in an exploded form a table unit which is constructed in accordance with one embodiment of the present invention and which may be advantageously applied to each of the table units shown in FIG. 1.
Figure 4:
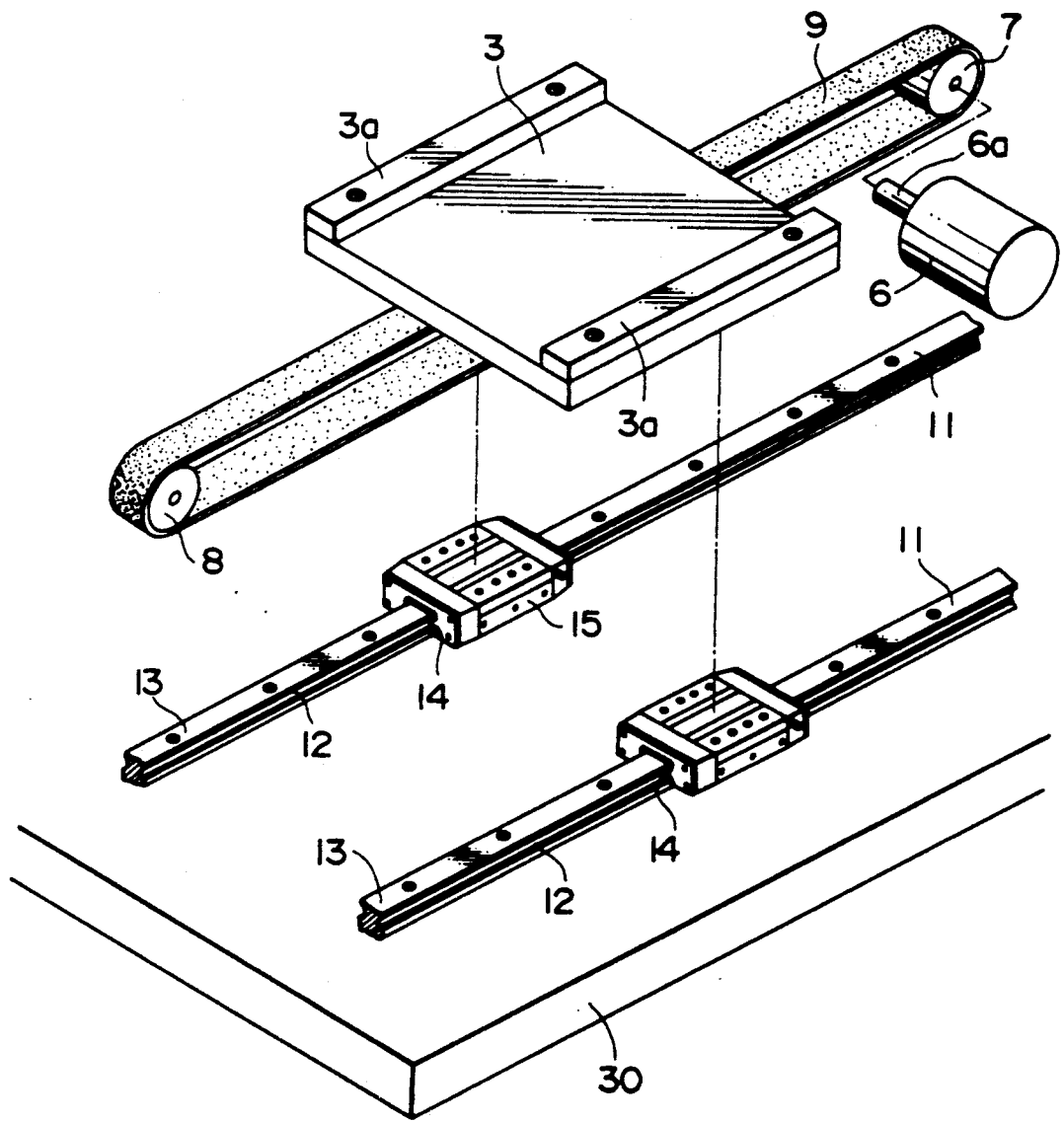
FIG. 4 is a schematic illustration showing in perspective view in an exploded form a typical prior art table unit in an X-Y drive apparatus.

Referring now to FIGS. 1 through 3, an X-Y drive apparatus constructed in accordance with one embodiment of the present invention will be described in detail below. As shown in FIG. 1, an X-Y drive apparatus or table assembly generally includes an X table unit 1 and a Y table unit 2. The X table unit 1 is elongated in X direction and the Y table unit 2 is elongated in Y direction which is different from the X direction and preferably substantially perpendicular to the X direction. Both of the X and Y table units 1 and 2 are substantially identical in structure excepting their arrangement. That is, the X table unit 1 is mounted on a desired object, such as a frame, while the Y table unit 2 is mounted on the table 3 of the X table unit 1, so that the table 3 of the Y table unit 2 may move in any desired direction in a plane. Since the overall structure of the X-Y drive apparatus shown in FIG. 1 has already been described in detail before, no additional description may be necessary except the above brief explanation.

FIG. 3 illustrates the detailed structure of the X table unit 1 constructed in accordance with one embodiment of the present invention. It is to be noted, however, that since both of the X and Y table units 1 and 2 are substantially identical in structure, the description regarding the X table unit 1 with reference to FIG. 3 is equally applicable to the Y table unit 2. As shown in FIG. 3, the X table unit 1 includes a table 3 which is accommodated to be movable along the longitudinal direction of an elongated housing comprised of a bottom plate 30, a pair of side plates 5 (see FIG. 1), a pair of end plates and a top cover plate 10 (see FIG. 1), which is somewhat narrower in width than the bottom plate 30. The table 3 is generally square or rectangle in shape in the illustrated embodiment, and it is provided with a pair of side projections 3a which project through the gaps defined between the top cover plate 10 and the pair of side plates 5 and above the top cover plate 10. Thus, the Y table unit 2 may be fixedly mounted on the table 3 with its bottom plate 30 in contact with the top end surfaces of the side projections 3a.

A pair of left and right supporting members 21 and 20 is fixedly attached to the bottom surface of the table 3 as spaced apart from each other and arranged in a line generally along the longitudinal axis of the table unit 1. The left and right supporting members 21 and 20 extend generally downwardly and rotatably support left and right moving pulleys 19 and 18, respectively. The pulleys 18 and 19 are called moving pulleys here because they move relative to the housing of table unit 1 as they are fixedly attached to the table 3. On the other hand, a right stationary pulley 7 is rotatably disposed near the right-hand end of the interior of the housing and a left stationary pulley 8 is rotatably disposed near the left-hand end of the interior of the housing. In illustrated embodiment, the right stationary pulley 7 is fixedly mounted on a motor shaft 6a of a motor 6 which in turn is fixedly mounted on the housing of table unit 1. Although not shown specifically, it should be understood that a supporting member is also provided in the housing to keep the left stationary pulley 8 rotatably in the interior of the housing fixed in position. Thus, the pulley 7 is a driving pulley and the pulley 8 is an idle pulley in the illustrated embodiment.

Also provided is a pair of brackets 17 and 17' which are fixedly mounted on the bottom plate 30 at a location between respective moving and stationary pulleys 18 and 7 or 19 and 8. In the illustrated embodiment, each of the brackets 17 and 17' is generally U-shaped and fixedly attached to the bottom plate 30 upside down, so that each of the brackets 17 and 17' defines a bridge-shaped structure and presents a raised holding section which is located above the bottom plate 30.

The illustrated table unit also includes a belt 16 which has one end fixedly attached to the raised holding section of right bracket 17 and extends first around the moving pulley 18 and then the pair of stationary pulleys 7 and 8 in the order mentioned and finally around the other moving pulley 19 to have its other end fixedly attached to the raised holding section of left bracket 17'.

With this structure, the table 3 may in any direction along the X axis depending on the direction of rotation of the driving pulley 7. Described more in detail with respect to the movement of the table 3 with particular reference to FIG. 2, when power is supplied to the motor 6 to rotate the driving pulley 7 clockwise, the belt 16 is forced to also travel clockwise. As a result, the moving pulleys 18 and 19 and thus the table 3 are caused to move toward the right as indicated in the dotted lines in FIG. 2. It is to be noted here that the movement of each of the moving pulleys 18 and 19 and also the table 3 is limited to a half of the amount of travel of the belt 16. Accordingly, the motion of the table 3 is decelerated relative to the rotation of the motor 6 and the driving force required for the belt 16 to cause the table 3 to move is only a half of the total driving force W, i.e., the motor 6 being only required to apply W/2 to cause the table 3 to move to the right. As a result, the load required for the motor 6 to move the table 3 is halved according to the structure of the present embodiment. This indicates a reduction of power requirement for the motor 6, and thus use may be made of a motor smaller in size and/or capacity for the motor 6 in the present embodiment.

On the other hand, when the motor 6 is energized to rotate counterclockwise, the motor 6 now pulls the lower run of the belt 16 so that the table 3, together with the moving pulleys 18 and 19, now travel to the left. In this instance also, the motor 6 is only required to share a half of the driving force W necessary to move the table 3 to the left.

Referring back to FIG. 3, the illustrated embodiment also includes a supporting mechanism for supporting the table 3 to be slidably movable relative to the bottom plate 30 or its housing. In the illustrated embodiment, a pair of linear motion guide units 11 is provided as located on both sides of the belt 16. Each of the linear motion guide units 11 includes an elongated rail 13 which is fixedly mounted on the bottom plate 30 extending in parallel with the longitudinal axis of the table unit 1. The rail 13 is generally rectangular in cross sectional shape and provided with a pair of left and right guide grooves on its opposite side surfaces. A generally saddle-shaped slider 15 is slidably mounted on the rail 13 in a straddling manner and the slider 15 includes a plurality of balls 14 which are partly exposed and received in the respective guide grooves 12 of the rail 13 so that a rolling contact is provided between the rail 13 and the slider 15. In the preferred embodiment, the slider 15 is provided with a pair of left and right endless circulating paths comprised of a load path section, a return path section and a pair of curved connecting path sections as well known in the art so that the balls in each of the endless circulating paths may roll endlessly to thereby provide an endless rolling contact motion between the rail 13 and the slider 15.

In the illustrated embodiment, since the pair of left and right linear motion guide units 11 is disposed on both sides of the coupling belt 16, the table 3 is fixedly attached to and thus supported on the sliders 15. With this structure, the table 3 can provide a bearing capability against a load applied thereto in the downward direction. It should be noted, however, that the present invention should not be limited only to the use of the illustrated linear motion guide units because use may be made of any other types of linear motion guide units, or for that matter, any means which can support the table 3 against a downward load applied thereto can be utilized.

In addition, although not shown specifically, a control circuit including a microcomputer or the like is preferably provided for controlling the movement of the table 3. Such a control circuit is preferably operatively coupled to one or more detectors mounted inside the housing, such as on the bottom plate 30, at appropriate locations so as to produce a position detection signal depending on the location of the table 3 along the longitudinal axis.

As described above, in accordance with the principle of the present invention, since a decelerating mechanism is provided between the driving motor 6 and the table 3, whereby the amount of travel of the table 3 is limited to a half of the amount of travel of the coupling belt 16, even if a backlash or the like is produced in the driving mechanism, it can be effectively absorbed to thereby eliminate or at least reduce an error to be applied to the movement of the table 3. In addition, even if the Y table unit is mounted on the table 3 of the X table unit, since the power requirement for the motor 6 has been significantly reduced, use may be made of a motor smaller in size and/or capacity.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A two-axis drive apparatus, comprising:
   a first table unit including an elongated first housing having a longitudinal axis which defines a first direction, a first table supported to be movable along said first direction back and forth and a first driving means operatively coupled to said first table for moving said first table back and forth along said first direction; and
   a second table unit including an elongated second housing fixedly mounted on said first table and having a longitudinal axis which defines a second direction different from said first direction, a second table supported to be movable along said second direction back and forth and a second driving means operatively coupled to said second table for moving said second table back and forth along said second direction,
   whereby each of said first and second driving means includes a pair of first guiding means fixedly attached to each of said first and second tables; a pair of second guiding means located away from said pair of first guiding means along the longitudinal axis and fixedly attached to each of said first and second housings; a pair of holding means located between said first and second guiding means and fixedly attached to said housing; and coupling means having one end fixedly attached to one of said pair of holding means and extending first around one of said first guiding means, then each of said second guiding means and then the remaining first guiding means to have its other end fixedly attached to the remaining holding means.

2. The apparatus of claim 1, wherein each of said first and second guiding means includes a rotatably supported rotary member around which said coupling means extend.

3. The apparatus of claim 2, wherein said rotary member is a pulley.

4. The apparatus of claim 1, wherein said coupling means includes a belt.

5. The apparatus of claim 2, wherein said driving means further includes a motor which has a motor shaft operatively coupled to one of said rotary members of said second guiding means.

6. The apparatus of claim 1, wherein each of said holding means includes a bracket.

7. The apparatus of claim 1, wherein each of said first and second table units further includes means for supporting each of said first and second tables so as to bear a load applied thereto in a downward direction.

8. The apparatus of claim 7, wherein said supporting means includes at least one linear motion guide unit interposed between each of said first and second housings and corresponding each of said first and second tables.

9. The apparatus of claim 1, wherein said first direction is substantially perpendicular to said second direction.

* * * * *